US012645863B2

(12) United States Patent　(10) Patent No.: US 12,645,863 B2

McClure et al.　(45) Date of Patent: Jun. 2, 2026

(54) SYSTEMS AND METHODS FOR DISCLOSURE VALIDATION

(71) Applicant: Wells Fargo Bank, N.A., San Francisco, CA (US)

(72) Inventors: Scott McClure, Charlotte, NC (US); Michael Deninno, Charlotte, NC (US); Isha Singh, St. Louis, MO (US); Mark Hanis, St. Louis, MO (US); Sarai Green, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 100 days.

(21) Appl. No.: 18/504,910

(22) Filed: Nov. 8, 2023

(65) Prior Publication Data

US 2025/0148188 A1　May 8, 2025

(51) Int. Cl.
　*G06F 40/117*　(2020.01)
　*G06F 40/109*　(2020.01)
　*G06F 40/279*　(2020.01)
　*H04L 51/02*　(2022.01)

(52) U.S. Cl.
　CPC .......... *G06F 40/117* (2020.01); *G06F 40/109* (2020.01); *G06F 40/279* (2020.01); *H04L 51/02* (2013.01)

(58) Field of Classification Search
　CPC ...... G06F 16/93; G06F 40/117; G06F 40/109; G06F 40/279; H04L 51/02
　See application file for complete search history.

(56) References Cited

U.S. PATENT DOCUMENTS

| | | | | |
|---|---|---|---|---|
| 9,754,263 B1 * | 9/2017 | Apple | | G06Q 30/0185 |
| 10,007,882 B2 * | 6/2018 | Belenzon | | G06N 7/01 |
| 10,163,153 B1 * | 12/2018 | Constantine | | G06Q 40/00 |
| 10,664,528 B1 * | 5/2020 | Fraser | | G06F 16/93 |
| 10,713,664 B1 | 7/2020 | Alagappan et al. | | |
| 11,568,285 B2 | 1/2023 | Sears et al. | | |
| 2002/0099829 A1 * | 7/2002 | Richards | | H04L 67/1008 |
| | | | | 709/227 |
| 2008/0155411 A1 * | 6/2008 | Christensen | | G06F 16/958 |
| | | | | 707/E17.116 |

(Continued)

FOREIGN PATENT DOCUMENTS

CN　　　115271674 A　　11/2022

*Primary Examiner* — Wilson W Tsui

(74) *Attorney, Agent, or Firm* — K&L Gates LLP

(57)　ABSTRACT

Systems, apparatuses, methods, and computer program products are disclosed for disclosure validation. A method includes determining an applicability status for digital content indicating whether a required disclosure applies to the digital content, and determining a disclosure inclusion status for the digital content indicating whether the digital content includes a candidate disclosure. The method also includes, in response to determining a disclosure inclusion status that indicates that the digital content includes the candidate disclosure, determining a conformity status for the digital content that indicates whether the candidate disclosure conforms to a set of styling requirements, determining a digital content status for the digital content based on at least one of the applicability status, the disclosure inclusion status, and the conformity status, and causing presentation of the digital content status.

20 Claims, 8 Drawing Sheets

(56) References Cited

U.S. PATENT DOCUMENTS

| | | | |
|---|---|---|---|
| 2011/0137921 A1* | 6/2011 | Inagaki | G06F 16/3347 |
| | | | 707/E17.061 |
| 2012/0191792 A1* | 7/2012 | Chebiyyam | H04L 51/42 |
| | | | 709/206 |
| 2016/0171351 A1* | 6/2016 | Scillieri | G06K 15/1805 |
| | | | 358/1.15 |
| 2021/0119945 A1* | 4/2021 | Sohum | G06N 5/01 |
| 2022/0067365 A1* | 3/2022 | Agrawal | G06V 30/414 |
| 2023/0186382 A1* | 6/2023 | Sellick | G06Q 20/102 |
| | | | 705/38 |
| 2023/0297785 A1* | 9/2023 | Lamm | G06F 40/35 |
| | | | 704/232 |

* cited by examiner

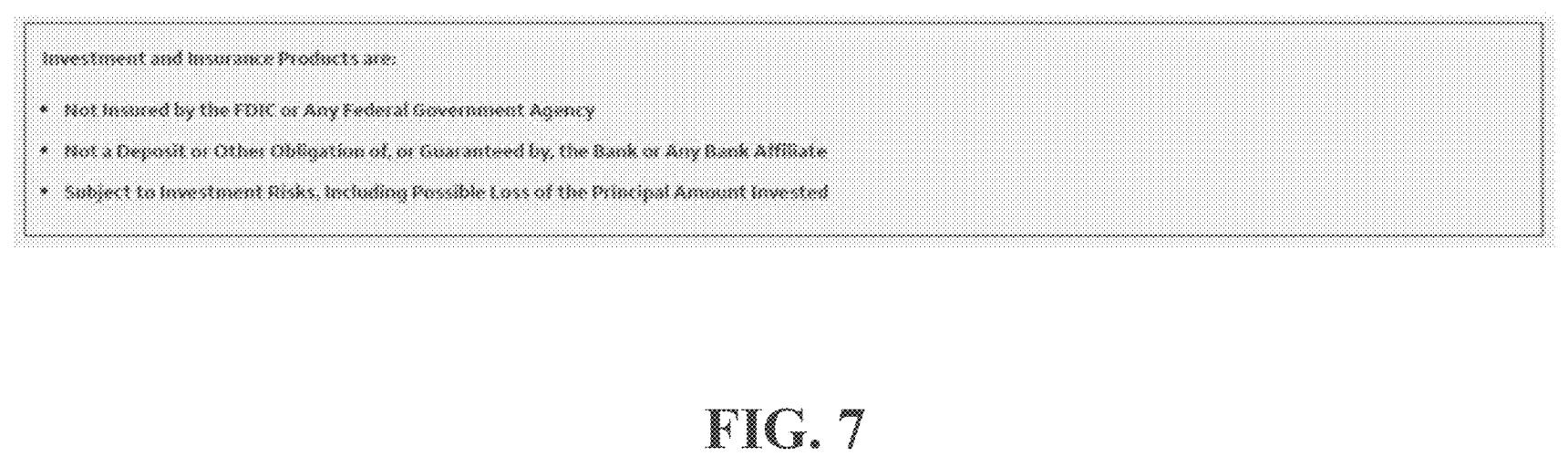

Investment and Insurance Products are:

* Not Insured by the FDIC or Any Federal Government Agency

* Not a Deposit or Other Obligation of, or Guaranteed by, the Bank or Any Bank Affiliate

* Subject to Investment Risks, Including Possible Loss of the Principal Amount Invested

FIG. 7

SYSTEMS AND METHODS FOR DISCLOSURE VALIDATION

BACKGROUND

Certain content may be required to disclose pertinent information such that users viewing the content are adequately informed about the content. However, validating whether content includes a required disclosure and whether that disclosure adheres to a set of standards presents challenges in cases where a large number of varying types of content are continuously being developed, distributed, and updated.

BRIEF SUMMARY

Entities (e.g., corporations, organizations, financial advisors, or the like) may disseminate content to users (e.g., customers or more generally the public) for various purposes such as marketing, advertising, customer support, education, product information, and/or the like. Such content include physical content (e.g., paper letters or other documents, billboards, etc.) and/or digital content (e.g., web pages, emails, document files, etc.).

Certain content that is disseminated to users may be required (e.g., by law) to include a disclosure which pertains to the nature of the content. As one example, the Office of the Comptroller of the Currency (OCC), a United States federal agency that regulates national banks, sets certain requirements for banks when offering non-deposit investment products (NDIP), such as securities, mutual funds, and annuities. One such requirement is that the banks provide a clear and comprehensive disclosure to customers when offering NDIP for sale. The disclosure is intended to ensure that customers have access to essential information about the products they are considering purchasing (allowing them to make informed investment decisions). Failure to provide an appropriate disclosure when offering NDIP may result in fines or other penalties for the bank.

When content (physical or digital) is disseminated by the bank to customers, it is important that any investment-related content pertaining to NDIP includes the required disclosure in order for the bank to comply with the OCC requirements. For example, a web page offering or mentioning NDIP should include text expressing the required disclosure and in the format required by the OCC. However, given the vast amount of content (e.g., in the form of communications (e.g., email messages, chats, phone conversations, etc.), web page deployments or updates, forms, letters, and/or the like) that is continuously proffered by a bank on a minute-by-minute basis, significant challenges are encountered when attempting to ensure that any applicable content includes the required disclosure before being viewed by a customer.

In today's setting, a publisher submits new content for manual review to ensure that the content contains a required disclosure (if applicable). This process involves a human reviewer who must comb through the content to determine applicability and, if applicable, confirm presence of a disclosure and whether the disclosure meets stylistic requirements mandated by the federal agency. This is ineffective for several reasons. First, the content may be lengthy and require significant time to read through, therefore delaying the publication of the content and increasing the likelihood the human reviewer could miss a term or phrase related to NDIP. Moreover, an extraordinary amount time may be wasted evaluating lengthy pieces of content which are eventually deemed to not require a disclosure at all. Additionally, it is risky to depend on a human to assess whether a disclosure meets certain stylistic requirements. For example, to the human eye, a font size of the disclosure may appear to meet a required font size, when in fact it does not. For web-based digital content, the human reviewer would need to manually review markup code for the digital content, which may be thousands of lines long, in order to accurately assess a stylistic requirement such as a font size, boxing, bolding, or similar stylistic requirement. This review may require a significant amount of time and is also extremely prone to human error. For example, due to a lack of readability of markup code in some instances, a section of the markup code containing style information which the human reviewer thinks applies to a disclosure may in reality actually apply to a different section of the webpage that is unrelated to the disclosure.

Further, as published content (e.g., content which has already been made publicly accessible or viewable by one or more customers) may be modified over time, it is unrealistic to expect, and unmanageable for, a human reviewer (or team of human reviewers) to timely address each and every instance of change to a vast amount of published content and readily identify whether those changes now require the content to include a disclosure before those changes are viewed by customers.

In contrast to these conventional techniques for determining whether a required disclosure applies to certain content and validating whether applicable content includes a required disclosure, example embodiments described herein provide an automated disclosure validation tool which readily identifies (i) applicable content requiring a disclosure and (ii) instances of compliance or non-compliance with respect to a disclosure in both pre-publishing and post-publishing contexts.

In various embodiments, a disclosure validation system determines an applicability status for digital content indicating whether a required disclosure applies to the digital content. In various embodiments, the disclosure validation system also determines a disclosure inclusion status for the digital content indicating whether the digital content includes a candidate disclosure. If the disclosure inclusion status indicates that the digital content includes the candidate disclosure, the disclosure validation system determines a conformity status for the digital content that indicates whether the candidate disclosure included in the digital content conforms to a set of styling requirements. The disclosure validation system then determines a digital content status for the digital content based on at least one of the applicability status, the disclosure inclusion status, and the conformity status, and causes presentation of the digital content status. In various embodiments, the disclosure validation system may also determine an identifier inclusion status for the digital content indicating whether the digital content includes an identifier indicating a previous review of the digital content. If the identifier inclusion status indicates that the digital content includes the identifier, the disclosure validation system then determines an identifier validation status for the identifier.

Accordingly, the present disclosure sets forth systems, methods, and apparatuses that provide improved disclosure validation. There are many advantages of these and other embodiments described herein. For instance, the disclosure validation system described herein reduces operational risk associated with human error by automating processes such as determining whether a required disclosure applies to digital content, verifying inclusion of an identifier within the content, verifying that the content contains a disclosure, and finally verifying whether the disclosure included in the content adheres to necessary styling requirements. By automating these processes, greater efficacy and efficiency is realized, and resources (both computational resources and manpower) that would otherwise be bottlenecked by manual review are freed such that other tasks may be performed. Additionally, the disclosure validation system may process a multitude of pieces of digital content in bulk to determine and provide a digital content status for each piece of digital content in essentially real-time. Further, the disclosure validation system may automatically prompt performance of various actions, for example, in the event of non-compliance for existing published content, to immediately shield that content from further public view in a more efficient manner than humans would be capable of.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 7 illustrates an example representation of text of an example required disclosure, in accordance with some example embodiments described herein.

DETAILED DESCRIPTION

Figure 1:
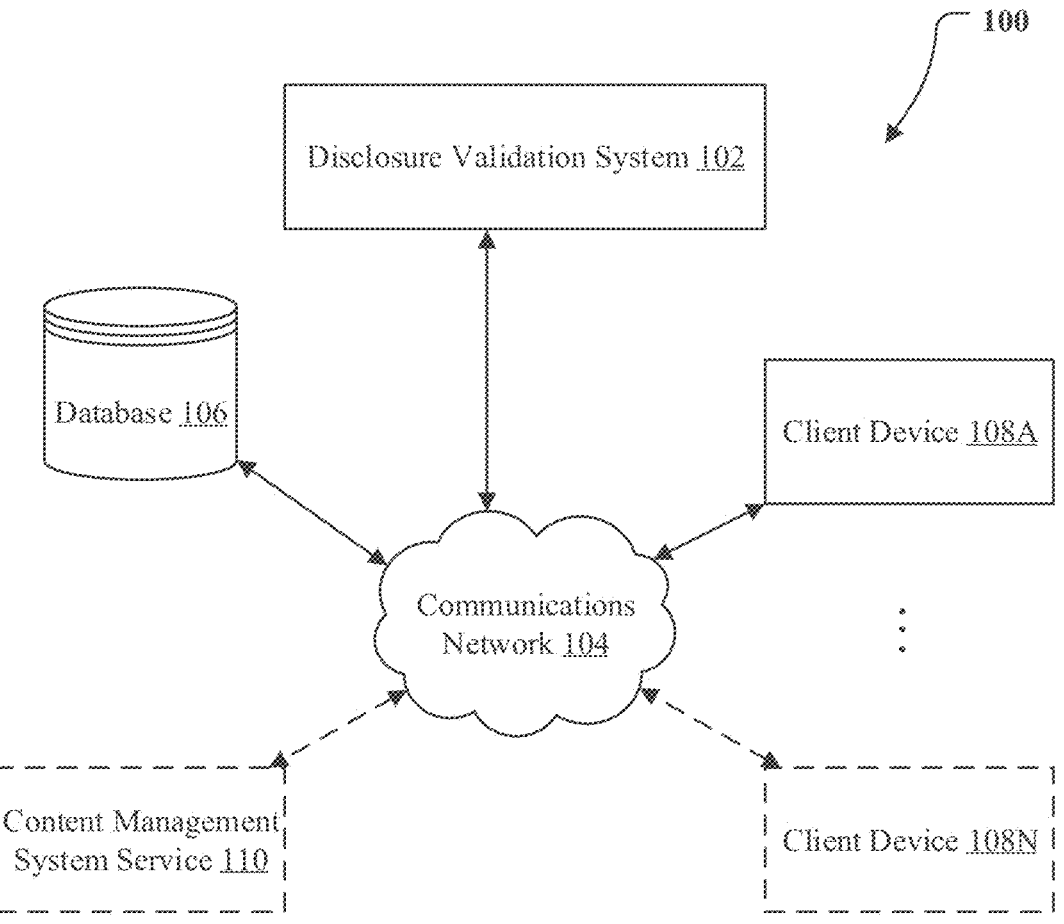
FIG. 1 illustrates a system in which some example embodiments may be used for disclosure validation.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "content" refers to a variety of tangible and intangible items that may be disseminated by an entity (such as a corporation, organization, financial institution, and/or the like) with the intention of public or customer consumption. Content encompasses both "physical content" and "digital content" and may include, but is not limited to, written materials, images, videos, audio recordings, software applications, transcripts (e.g., voice conversation transcripts generated using a speech-to-text tool), websites, web pages, interactive media, marketing materials, advertisements, and the like. Digital content may encompass both purely digital content (e.g., web pages) and digital versions of physical content (e.g., a Portable Document Format (PDF) file of a written letter). Content may be disseminated to inform, educate, promote to, entertain, or otherwise engage a target audience. Specifically, in various embodiments discussed herein, content constitutes a strategic resource utilized by an entity, such as a financial institution, to communicate information, build brand recognition, foster relationships, and/or enhance market presence across various channels and platforms.

The term "required disclosure" refers to specific information that is required to be provided to relevant authorities, customers, or the public, as mandated by applicable laws regulations or supervisory requirements. In some embodiments, a required disclosure may comprise specific, predefined text that is required to be included within content. In the context of a financial institution, the required disclosure may encompass various aspects of the bank's operations, financial health, risk management practices, and compliance with regulatory guidelines. The term "candidate disclosure" refers to a disclosure identified within content which may or may not conform to requirements associated with a required disclosure.

System Architecture

Example embodiments described herein may be implemented using any of a variety of computing devices or servers. To this end, FIG. 1 illustrates an example environment 100 within which various embodiments may operate. As illustrated, a disclosure validation system 102 may receive and/or transmit information via communications network 104 (e.g., the Internet) with any number of other devices, such as a database 106, one or more client devices 108A-108N, and a content management system service 110.

The disclosure validation system 102 may be implemented as one or more computing devices or servers, which may be composed of a series of components. Particular components of the disclosure validation system 102 are described in greater detail below with reference to apparatus 200 in connection with FIG. 2.

In some embodiments, the database 106 may comprise a distinct component from other components of the disclosure validation system 102. Database 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Database 106 may host the software executed to operate the disclosure validation system 102. Database 106 may store information relied upon during operation of the disclosure validation system 102, such as one or more predefined lexicons, models, training data, identifiers, predefined disclosure templates, various sets of styling requirements (each of which are further discussed below) that may be used by the disclosure validation system 102, digital content such as data and documents to be analyzed using the disclosure validation system 102, or the like. In addition, database 106 may store control signals, device characteristics, and access credentials enabling interaction between the disclosure validation system 102 and one or more of the client devices 108A-108N or content management system service(s) 110.

The one or more client devices 108A-108N may be embodied by any computing devices known in the art, and need not themselves be independent devices, but may be peripheral devices communicatively coupled to other computing devices. For example, a client device may comprise a laptop, smartphone, desktop computer, tablet, and/or the like.

The content management system service 110 may comprise a third-party service which manages a software application and a plurality of servers supporting the software application. The software application may be a Content Management System (CMS) which allows users to create, manage, organize, and publish digital content (e.g., to the web) via a user interface. A CMS may streamline content creation and editing processes to ensure consistent and efficient content delivery. In various embodiments, the CMS may be installed on one or more client devices 108A-108N. In various embodiments, the disclosure validation system 102 may integrate with a CMS (or multiple CMS) using an Application Programming Interface (API) that allows the systems to communicate and interact with each other via a defined set of rules and protocols. In this manner, users are able to realize the benefits of the disclosure validation system 102 directly through a content generation and publishing process within the CMS.

Example Implementing Apparatuses

Figure 2:
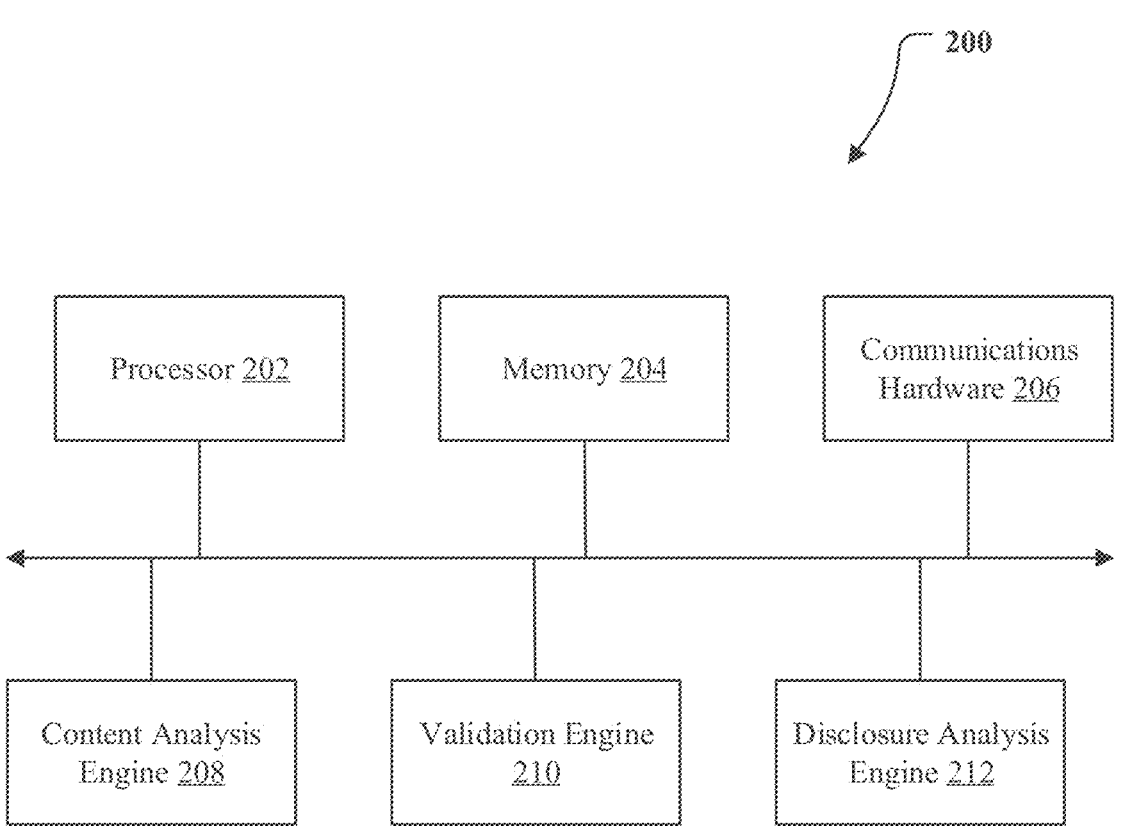
FIG. 2 illustrates a schematic block diagram of example circuitry embodying a system device that may perform various operations in accordance with some example embodiments described herein.

The disclosure validation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, a content analysis engine 208, a validation engine 210, and a disclosure analysis engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a content analysis engine 208 that processes digital content to determine an applicability status and a digital content status for digital content. The content analysis engine 208 may utilize processor 202, memory 204, or any other hardware component included in the apparatus 200 to perform these operations, as described in connection with FIG. 3 below. The content analysis engine 208 may further utilize communications hardware 206 to gather data from a variety of sources (e.g., one or more client devices 108A-108N, database 106, and/or content management system service 110, as shown in FIG. 1), and/or exchange data with a user. In order to determine an applicability status and a digital content status for digital content, content analysis engine 208 may utilize various scraping techniques to decipher information included in content. For example, in some embodiments, content analysis engine 208 may utilize a web scraping algorithm to parse data and extract information such as terms and/or values present within content. In the context of a website content (e.g., web pages), the content analysis engine 208 may traverse the website to parse structures of Hypertext Markup Language (HTML), Cascading Style Sheets (CSS), JavaScript (JS), or similar languages to identify and extract specific patterns, keywords, numerical values, and/or the like from a web page's source code or rendered content. By doing so, in some embodiments and as further discussed below, the content analysis engine 208 may compare extracted terms to a predefined lexicon to determine an applicability status for the digital content based on whether one or more terms extracted from the content are included in the predefined lexicon.

In some embodiments, the content analysis engine 208 may utilize one or more natural language processing (NLP) techniques in order to extract information such as terms and/or values present within content, such as in the context of a document file (e.g., a PDF or the like). For example, the content analysis engine 208 may preprocess a document file by removing punctuation and/or other elements. The content analysis engine 208 may then perform a tokenization operation on the preprocessed document file to identify individual terms (e.g., tokens). The content analysis may then process the identified terms in connection with the predefined lexicon as discussed above.

In some embodiments, the content analysis engine 208 may utilize one or more machine learning and/or artificial intelligence techniques to determine an applicability status for digital content. For example, in some embodiments, the content analysis engine 208 may process digital content using a model (e.g., a machine learning model) to determine a probability score representing a likelihood that a required disclosure applies to the digital content. In some embodiments, the model may be trained using historical digital content to which the required disclosure was deemed to be applicable. For example, training data for the model may include pieces of digital content which are known to require a disclosure. In this regard, the model may be trained in a supervised manner in order for the model to accurately identify, via a probability score, when a piece of digital content is likely to require a disclosure.

In addition, the apparatus 200 further comprises a validation engine 210 that determines an identifier inclusion status and an identifier validation status for digital content. The validation engine 210 may utilize processor 202, memory 204, or any other hardware component included in the apparatus 200 to perform these operations, as described in connection with FIGS. 4-5 below. The validation engine 210 may further utilize communications hardware 206 to gather data from a variety of sources (e.g., one or more client devices 108A-108N, database 106, and/or content management system service 110, as shown in FIG. 1), and/or exchange data with a user. In some embodiments, the validation engine 210 may utilize scraping techniques (similar to scraping techniques utilized by the content analysis engine 208 described above) to determine whether digital content includes an identifier (e.g., within the digital content, such as within metadata, code (e.g., markup language, software code, and/or the like), and/or the like associated with the digital content.

In some embodiments, the identifier may be a specific type of identifier (in a specific format) that indicates whether the digital content has previously undergone a review (e.g., a manual (human) review or an automated system review). In some embodiments, the identifier may be associated with a (e.g., third-party) compliance system which issues and tracks identifiers for various digital content. For example, a compliance system may issue identifiers for various reasons, such as to link specific documents or other types of content to corresponding individuals and/or departments for oversight, to associate specific regulatory requirements or obligations with relevant content, individuals, or departments, and/or to create comprehensive audit trails which show a chronological record of compliance-related activities (such as reviews) for various content. In some embodiments, for example, once a team confirms they have reviewed a piece of digital content, the digital content may be assigned a unique identifier to be embedded within the digital content (e.g., as metadata or the like). In some embodiments, the identifier may be time-limited and associated with an expiration date, which defines a point in time at which the digital content should be reviewed again and assigned a new identifier and/or updated expiration date.

In some embodiments, the validation engine 210 is configured to compare an identifier included in digital content to one or more stored identifiers to determine whether a match exists between the identifier and a stored identifier of the one or more stored identifiers. In this regard, the validation engine 210 may access a repository (e.g., database 106) storing registered identifiers to validate an identifier included in digital content.

The validation engine 210 may serve several purposes. First, the validation engine 210 may be utilized to determine whether identifiers exist in digital content to ensure that the digital content has gone through a review process. Second, the validation engine 210 may also validate whether the content is still in compliance (even though it may have been assigned an identifier). In this regard, the validation engine 210 may serve to identify corner cases in which digital content went through a review process and was incorrectly assigned an identifier, or cases where the content was reviewed and published, but has since been superseded by a newer version. In other words, the validation engine 210 may readily identify instances where expired content is in circulation and/or being used or otherwise made publicly available such that the expired content can be quickly addressed and either updated and/or removed from public access.

The apparatus 200 further comprises a disclosure analysis engine 212 that determines a disclosure inclusion status and conformity status for digital content. The disclosure analysis engine 212 may utilize processor 202, memory 204, or any other hardware component included in the apparatus 200 to perform these operations, as described in connection with FIG. 3 below. The disclosure analysis engine 212 may further utilize communications hardware 206 to gather data from a variety of sources (e.g., one or more client devices 108A-108N, database 106, and/or content management system service 110, as shown in FIG. 1), and/or exchange data with a user. In some embodiments, to determine a disclosure inclusion status, the disclosure analysis engine 212 may reference one or more predefined disclosure templates (which may be stored, for example, in database 106) in order to compare a phrasing of the disclosure included in digital content to a predefined disclosure phrasing indicated by one or more of the predefined disclosure templates to ensure the phrasings are consistent. Additionally, in some embodiments, in order to determine a conformity status for digital content, the disclosure analysis engine 212 may reference a set of styling requirements (e.g., stored in database 106) in order to compare values associated with stylistic-related markup language of digital content to values indicated by the set of styling requirements to determine whether the values associated with the stylistic-related markup language correspond to the values indicated by the set of styling requirements. To identify stylistic-related markup language and the values associated therewith, the disclosure validation engine 212 may utilize scraping techniques (similar to scraping techniques utilized by the content analysis engine 208 described above).

Although components 202-212 are described in part using functional language, it will be understood that the particular implementations necessarily include the use of particular hardware. It should also be understood that certain of these components 202-212 may include similar or common hardware. For example, the content analysis engine 208, validation engine 210, and disclosure analysis engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the content analysis engine 208, validation engine 210, and disclosure analysis engine 212 may leverage processor 202, memory 204, or communications hardware 206 as described above, it will be understood that any of content analysis engine 208, validation engine 210, and disclosure analysis engine 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that content analysis engine 208, validation engine 210, and disclosure analysis engine 212 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of graphical user interfaces and flowcharts.

Example Operations

Figure 3:
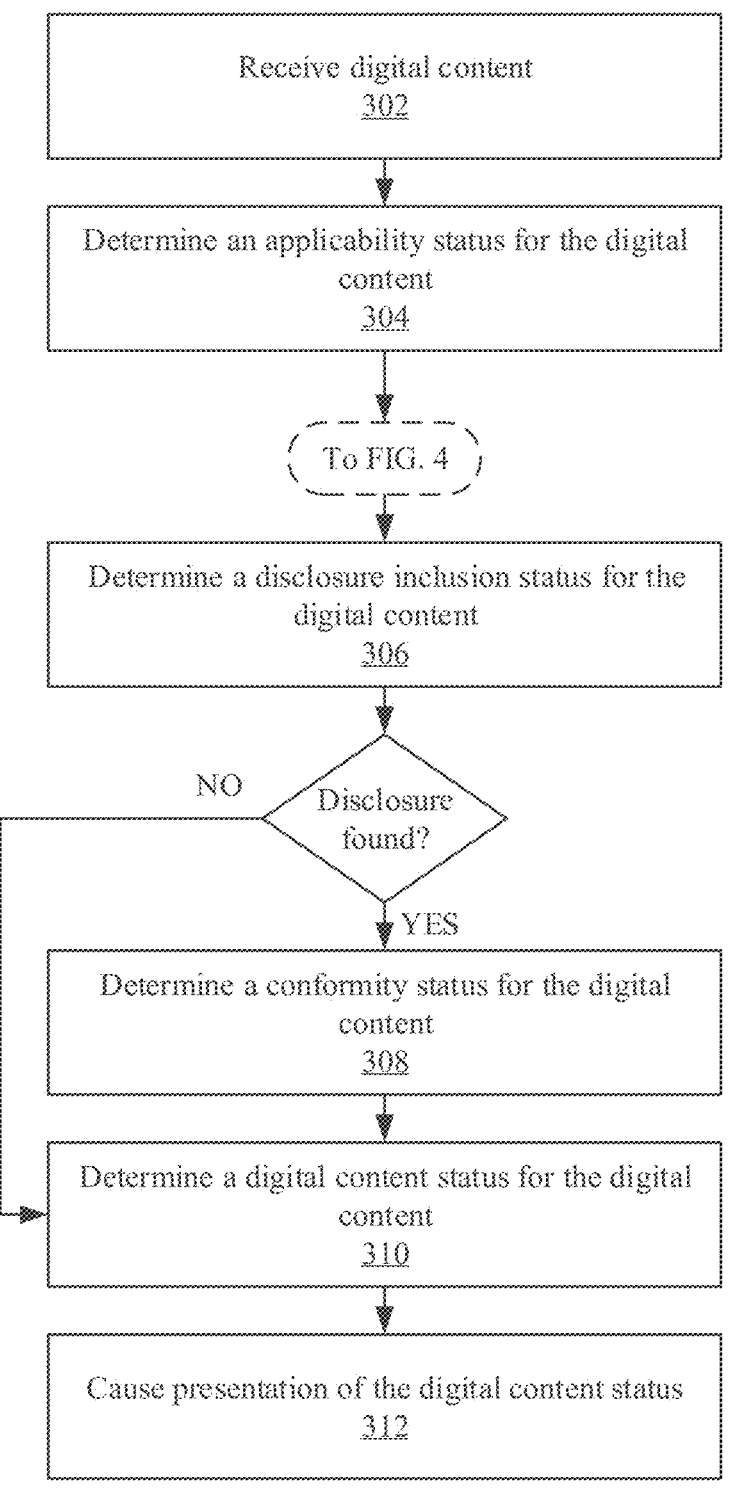
FIG. 3 illustrates an example flowchart for disclosure validation, in accordance with some example embodiments described herein.
Figure 4:
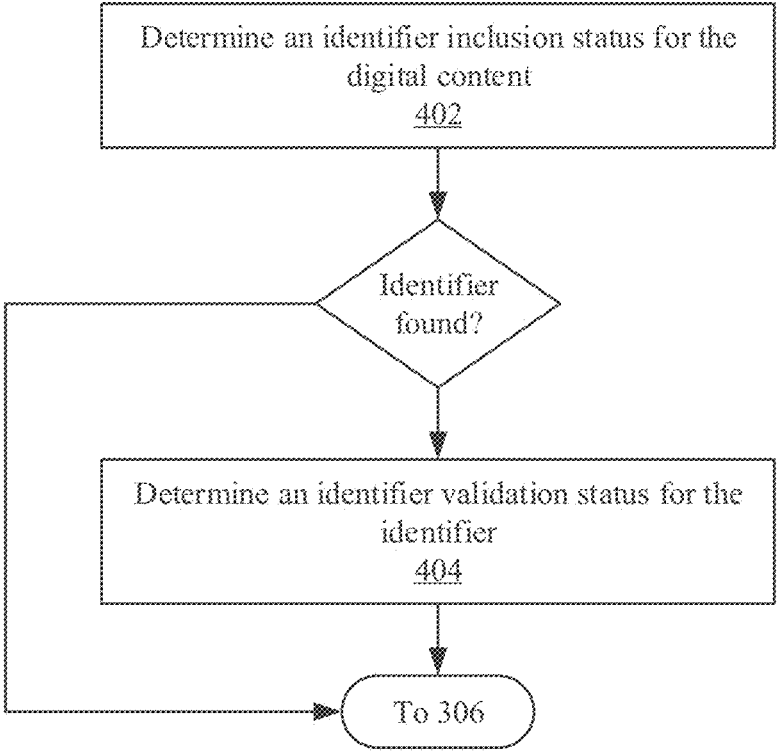
FIG. 4 illustrates an example flowchart for determining an identifier inclusion status and an identifier validation status for digital content, in accordance with some example embodiments described herein.
Figure 5:
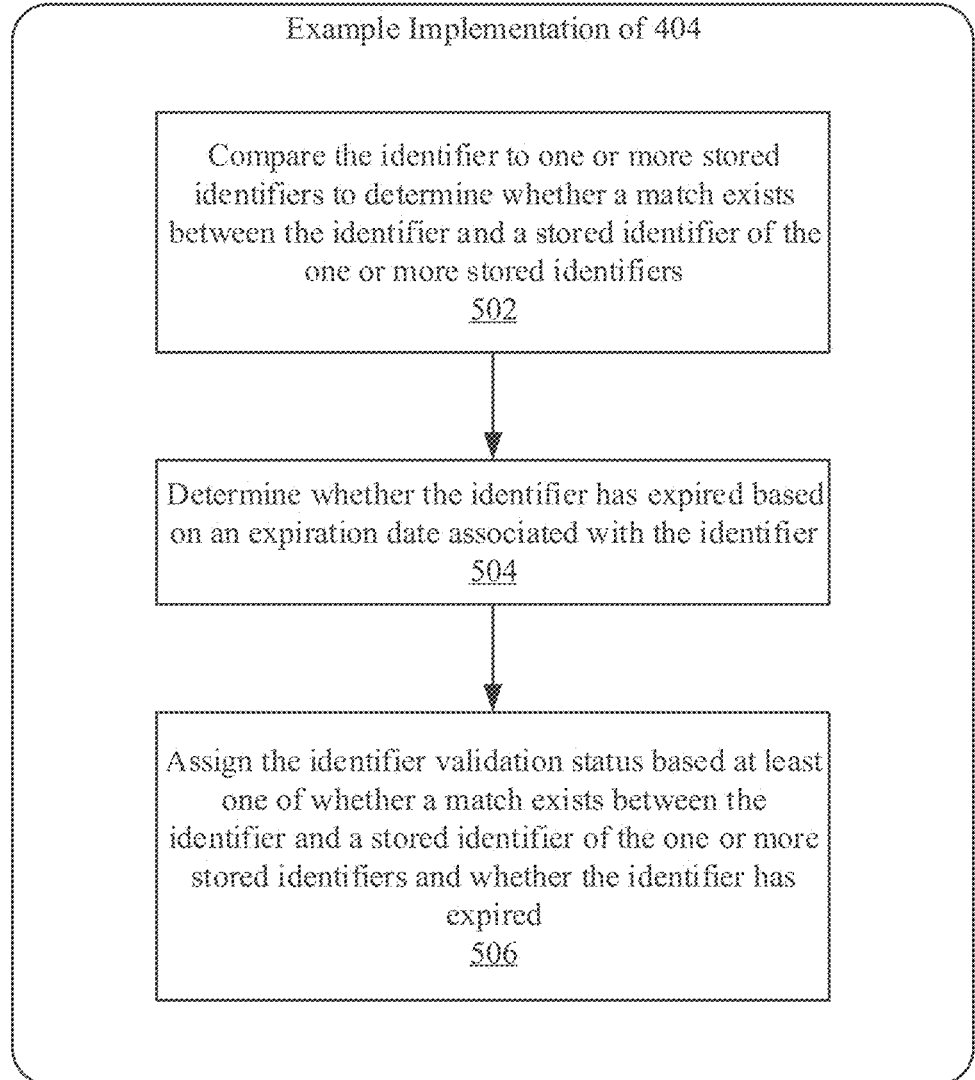
FIG. 5 illustrates another example flowchart for determining an identifier validation status for digital content, in accordance with some example embodiments described herein.

Turning to FIGS. 3-5, example flowcharts are illustrated that contain example operations implemented by example embodiments described herein. The operations illustrated in FIGS. 3-5 may, for example, be performed by system device 104 of the disclosure validation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, content analysis engine 208, validation engine 210, disclosure analysis engine, and/or any combination thereof. It will be understood that user interaction with the disclosure validation system 102 may occur directly via communications hardware 206, or may instead be facilitated by a separate client device (e.g., any of client devices 108A-108N, as shown in FIG. 1), and which may have similar or equivalent physical componentry facilitating such user interaction.

Turning first to FIG. 3, example operations are shown for disclosure validation.

As shown by operation 302, the apparatus 200 includes means, such as processor 202, memory 204, communications hardware 206, and/or the like, for receiving digital content. As noted previously, digital (i.e., electronic) content may encompass both purely digital content (e.g., web pages) and digital versions of physical content.

The disclosure validation system 102 may receive digital content in a variety of ways. In some embodiments, the disclosure validation system 102 may receive digital content by enabling users to upload digital content directly to the disclosure validation system 102 through one or more graphical user interfaces. In this regard, the apparatus 200 may include means, such as processor 202, memory 204, communications hardware 206, and/or the like, for causing presentation of one or more graphical user interfaces. The one or more graphical user interfaces may include upload fields and/or buttons which allow a user to attach a file or set of files and upload them to the disclosure validation system 102. In some embodiments, the one or more graphical user interfaces may enable a user to input a Uniform Resource Locator (URL) or a set of URLs directed to digital content (e.g., active web pages) to the disclosure validation system 102 which can then be subsequently validated by the disclosure validation system.

Figure 6A:
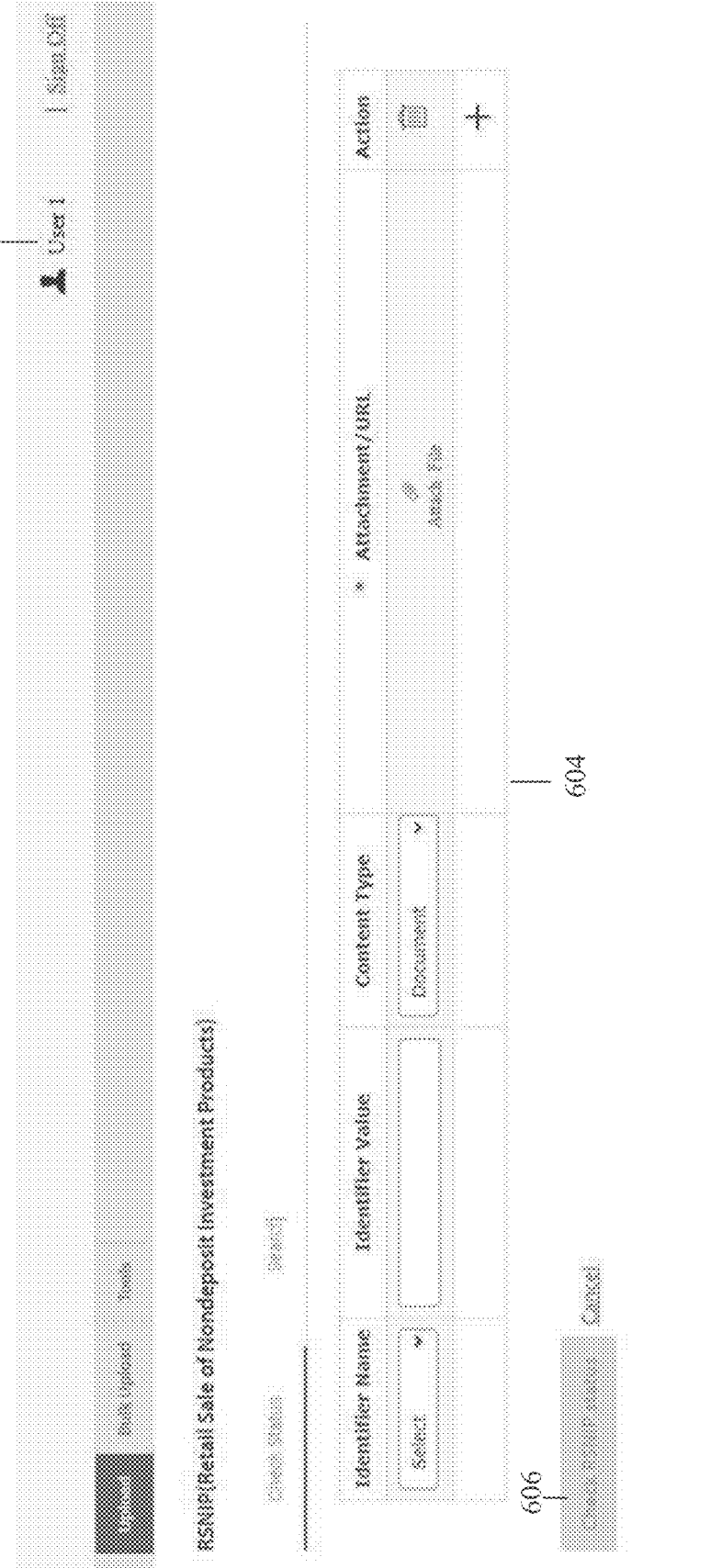
FIG. 6A illustrates an example user interface used in some example embodiments described herein.
Figure 6B:
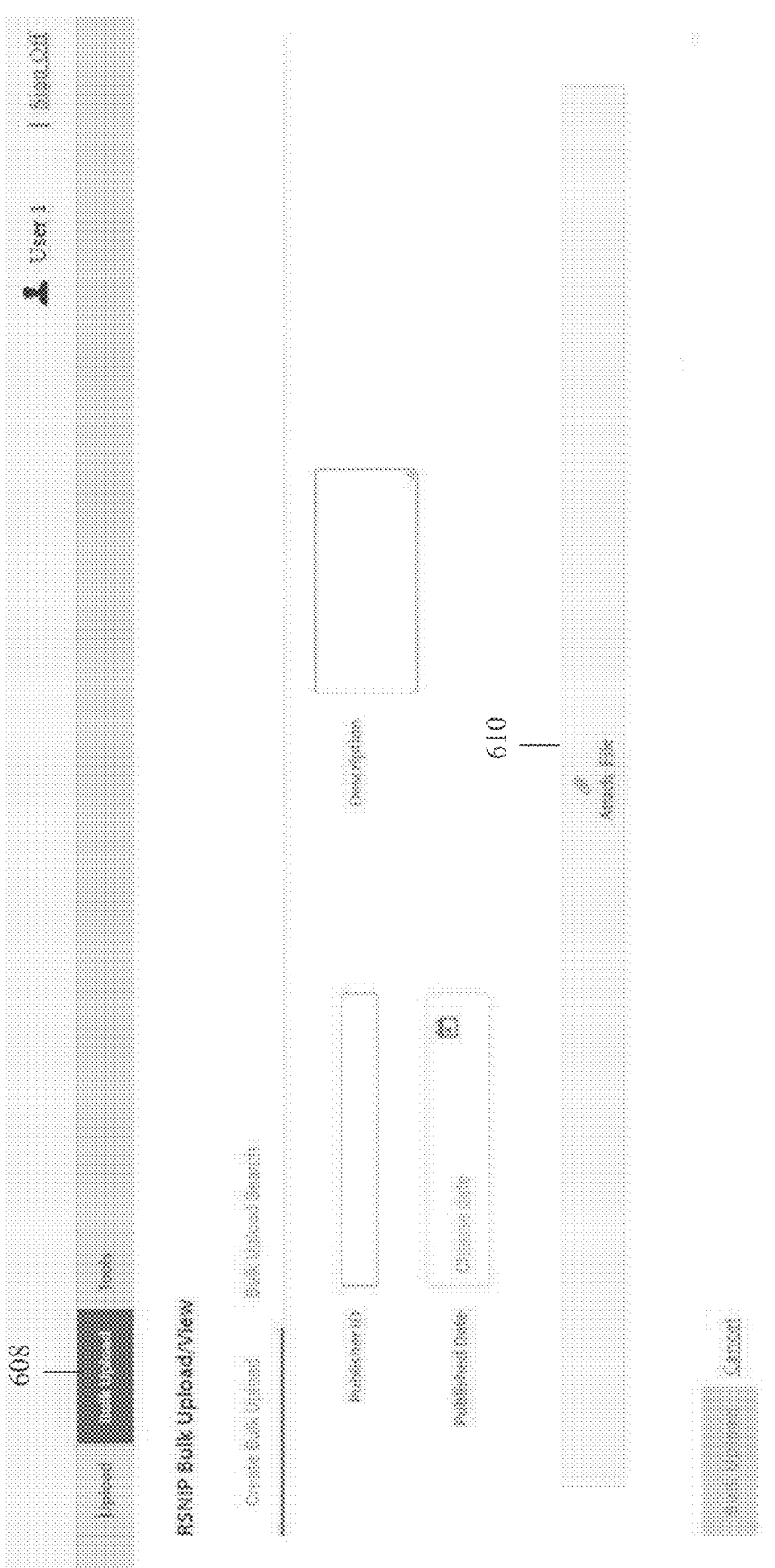
FIG. 6B illustrates an example user interface used in some example embodiments described herein.

Example graphical user interfaces are shown in FIGS. 6A and 6B. As noted previously, a user may interact with the disclosure validation system 102 by directly engaging with communications hardware 206 of an apparatus 200. In such an embodiment, the graphical user interfaces shown in FIGS. 6A and 6B may be displayed to a user by the apparatus 200. Alternatively, a user may interact with the disclosure validation system 102 using a separate client device (e.g., any of client devices 108A-108N, as shown in FIG. 1), which may communicate with the disclosure validation system 102 via communications network 104. In such an embodiment, the graphical user interfaces shown in FIGS. 6A and 6B may be displayed to the user by the client device.

As shown in FIG. 6A, a user may log in to the disclosure validation system 102 with user credentials (e.g., a username, password, biometric reading, and/or other factors) in order to access and perform tasks within the disclosure validation system 102. In some embodiments, the user's display name 602 may be displayed on the graphical user interface, indicating the user is logged in to the disclosure validation system 102. As shown, a box 604 may allow various user inputs, such as an identifier name, identifier value, and content type. In some embodiments, the user may specify the content type (e.g., document, website, etc.) from a dropdown list. As shown, the user may also attach a file (e.g., digital content), add additional files, and/or remove files. Once a file is attached, the user may select the check status button 606 in order to upload the digital content to the disclosure validation system 102 and for the disclosure validation system 102 to process the files as further discussed herein. In this regard, the apparatus 200 includes means, such as processor 202, memory 204, communications hardware 206, and/or the like, for receiving digital content based on an upload of the digital content by a user.

As shown by FIG. 6B, a user may select the bulk upload button 608 in order to upload multiple pieces of digital content for subsequent processing by the disclosure validation system 102. As shown, a user may create a bulk upload by entering a publisher identifier, published date (if the content is already published), and a description of the content. The user may also select the attach file button 610 in order to upload a file or multiple files containing digital content (e.g., documents, URLs, etc.).

In some embodiments, the disclosure validation system 102 may receive digital content in a dynamic manner. For example, in a pre-publishing context, the disclosure validation system 102 may detect or receive an indication regarding unpublished digital content currently being generated. For example, a user may be creating digital content in connection with a CMS with which the disclosure validation system 102 is integrated, and, through an API, the disclosure validation system 102 may automatically perform various operations (as discussed herein in connection with FIGS. 3-5) on the digital content to validate the content with respect to a required disclosure. In this regard, the apparatus 200 includes means, such as processor 202, memory 204, communications hardware 206, or the like, for receiving digital content in response to a dynamic generation of the digital content.

In some embodiments, in addition to a CMS, the disclosure validation system 102 may also integrate with one or more other platforms, such as a messaging platform, email platform, or the like, in order to dynamically receive digital content generated on those platforms and validate the digital content prior to publishing or immediately in response to publishing of the digital content. For instance, in some embodiments, digital content may comprise a message dynamically generated by a chatbot during an active chat session with a user (e.g., before the message is sent to the user or after the message is sent to the user). In this way, the disclosure validation system 102 may facilitate the monitoring of active chat sessions between chatbots and users (e.g., customers of a bank) in order to receive digital content (e.g., messages) from a chatbot messaging platform and readily identify instances in which a message contains language that warrants a required disclosure. For example, if the message generated by a chatbot were to include information about NDIP, the disclosure validation system 102 may readily identify (e.g., through performing operations discussed below in connection with FIGS. 3-5) that a required disclosure should be included as part of the message (e.g., in an instance in which the message has not yet been sent to the user) or immediately provided by the chatbot as a follow-up message to the message.

As another example, in some embodiments, digital content may comprise an electronic mail (email) message dynamically generated by a user (e.g., a bank employee) during an active user session with an email application (e.g., before the email message is sent to a customer or after the message is sent to the customer). In this way, the disclosure validation system 102 may facilitate the monitoring of active email sessions for certain users (e.g., employees of a bank) in order to receive digital content (e.g., emails) from an email platform and readily identify (e.g., through performing operations discussed below in connection with FIGS. 3-5) instances in which an email message (e.g., an unsent (draft) email message or sent email message) contains language that warrants a required disclosure. Continuing with the above example, if the email message were to include information about NDIP, the disclosure validation system 102 may readily identify that a required disclosure should be included as part of the email message (e.g., in an instance in which the email message has not yet been sent to a customer) or immediately provided by either the employee or through an automated email system as a follow-up message to the email message.

As another example, in some embodiments, digital content may comprise a transcript (e.g., generated via a speech-to-text mechanism) that includes text of a conversation (e.g., having taken place over a phone call, virtual web meeting, and/or the like). In this example, the disclosure validation system 102 may facilitate the monitoring of conversations taking place between entities (e.g., financial advisors and/or other members of a financial institution) and clients to ensure compliance when discussing NDIP. For example, the disclosure validation system 102 may be configured to automatically receive transcripts of phone calls (e.g., as they occur) in order to readily identify whether these calls require a disclosure and if proper disclosure was communicated on the call. In this manner, as discussed further herein, the disclosure validation system 102 may identify specific terms or a combination of terms that may require review of the transcription and the original call recording. In addition, where certain disclaimers are required to be supplied to a client by the entity, the disclosure validation system 102 can confirm the disclosure is accurate and complete.

In some embodiments, in a post-publishing context, the disclosure validation system 102 may utilize various techniques to continuously receive and process multiple pieces of published digital content on a regular basis. For example, in the context of a bank, the disclosure validation system 102 may interact with a third-party tool that continuously crawls the bank's website (and any associated websites) and the disclosure validation system 102 may then receive and process various web pages to ensure that any web pages requiring a disclosure adhere to requirements for the specific disclosure. In some embodiments, the disclosure validation system 102 may itself crawl the bank's website and process the web pages. In this regard, the disclosure validation system 102 may continuously receive digital content (e.g., in bulk, such as batches of a plurality of URLs) and validate the digital content with respect to a required disclosure.

As shown by operation 304, the apparatus 200 includes means, such as processor 202, memory 204, content analysis engine 208, and/or the like, for determining an applicability status for digital content. The applicability status may indicate whether a required disclosure applies to the digital content. For instance, continuing with the above example of NDIP, the applicability status may indicate that the required disclosure applies to the digital content when the digital content includes one or more terms pertaining to NDIP, and the applicability status may indicate that the required disclosure does not apply to the digital content when the digital content does not include any terms pertaining to NDIP. In this regard, in some embodiments, the applicability status may reflect a binary (yes or no) determination as to whether the digital content should include a required disclosure.

In some embodiments, determining the applicability status for the digital content may include parsing the digital content to identify terms (e.g., words and/or phrases) contained within the digital content. In this regard, the apparatus 200 includes means, such as processor 202, memory 204, content analysis engine 208, and/or the like, for parsing the digital content to generate a term set. The term set may comprise all terms identified within the digital content.

As discussed above, parsing the digital content may involve using one or more scraping techniques and/or NLP techniques to identify and extract terms in the digital content. For example, when the digital content is a web page, the content analysis engine 208 may utilize a web scraping algorithm to parse data and extract information such as terms and/or values present within the digital content. In this regard, the content analysis engine 208 may traverse the website to parse structures of HTML, CSS, JS, and/or similar languages to identify and extract specific terms from a web page's source code and/or rendered content. In the context of a document file (e.g., a PDF), the content analysis engine 208 may utilize scraping techniques and/or one or more NLP techniques in order to extract information such as terms and/or values present within the digital content, which may involve preprocessing and subsequently tokenizing the digital content to generate a term set, as discussed above.

Once generated, the term set may be compared to a predefined lexicon in order to determine whether any terms included in the predefined lexicon are included in the term set (or, in other words, are included in the digital content). In this regard, the apparatus 200 includes means, such as processor 202, memory 204, content analysis engine 208, and/or the like, for determining whether the term set includes at least one term in a predefined lexicon.

In the context of NDIP, the predefined lexicon may comprise a plurality of investment-related terms and phrases known to pertain to NDIP. For example, the predefined lexicon may include terms such as, but not limited to, annuity, asset allocation, bonds, brokerage account, derivatives, equities, exchange funds, financial advisor, financial planning, fixed income, fund, funds, hedge funds, insurance, investing, investment, investment planning, margin, mutual funds, portfolio, private equity, retirement, trading, and/or similar terms. The predefined lexicon may include terms in multiple languages (e.g., terms in both in English and Spanish, and/or other languages).

In some embodiments, the content analysis engine 208 may determine that a required disclosure applies to the digital content in response to identifying at least one term of the predefined lexicon as being present in the term set. In other words, the content analysis engine 208 may determine that the digital content should include the required disclosure based on the digital content including at least one term from the predefined lexicon.

In some cases, however, the presence of a single term from the predefined lexicon in the digital content may not necessarily mean that the required disclosure should be included in the digital content. For instance, while the predefined lexicon may contain the term "funds," the digital content itself may discuss the term "funds" in a different context unrelated to NDIP. In this regard, in some embodiments, the content analysis engine 208 may consider a combination of terms from the predefined lexicon when assessing applicability of the digital content in order to avoid false positives. For instance, digital content found to contain a combination of two or more terms from the predefined lexicon may indicate that the required disclosure applies to the digital content (and therefore should be included in the digital content).

In some embodiments, the content analysis engine 208 may consider terms on their own or a combination of terms when determining an applicability status for digital content, and these term combinations may be predefined. For instance, inclusion of the single term "investment" in digital content may be enough to determine an applicability status that indicates that the required disclosure applies to the digital content, whereas the single term "funds" may not be enough. However, when the term "funds" is found in combination with one or more other terms, such as the term "trading," the content analysis engine 208 may determine an applicability status that indicates that the required disclosure applies to the digital content. In this regard, the apparatus 200 includes means, such as processor 202, memory 204, content analysis engine 208, and/or the like for determining, in response to determining that the term set includes at least one term associated with a predefined lexicon or a combination of two or more terms in the predefined lexicon, an applicability status that indicates that the required disclosure applies to the digital content.

In some embodiments, in addition or as an alternative to utilizing scraping and/or NLP techniques, the content analysis engine 208 may utilize a machine learning (ML) model or the like to determine whether a required disclosure applies to digital content. For example, the content analysis engine 208 may utilize a model which has been trained using historical digital content to which a required disclosure was deemed to be applicable. In other words, labeled training data in the form of historical content requiring a required disclosure may be used to train the model in a supervised manner such that the model can output a probability score that represents a likelihood that a required disclosure applies to a piece of digital content. In this regard, the apparatus 200 includes means, such as processor 202, memory 204, content analysis engine 208, and/or the like, for processing, using a model trained using historical digital content to which the required disclosure was deemed to be applicable, the digital content to determine a probability score representing a likelihood that the required disclosure applies to the digital content. For example, the probability score may comprise a value between 0 and 1, which a value closer to 1 indicating a higher likelihood that the required disclosure applies to the digital content. The content analysis engine 208 may compare the probability score to a predefined probability threshold to determine whether the probability score satisfies the predefined probability threshold. For example, if a probability score meets or exceeds 0.6, the content analysis engine 208 may assign an applicability status to the digital content that indicates that the required disclosure applies to the digital content. Likewise, if a probability score falls below 0.6, the content analysis engine 208 may assign an applicability status to the digital content that indicates that the required disclosure does not apply to the digital content.

In some embodiments, in response to determining an applicability status that indicates that the required disclosure does not apply to the digital content, the method may proceed to operation 310, wherein the disclosure validation system 102 determines a digital content status for the digital content based on the applicability status (as further discussed below), without performing operations 306 and 308 and thus bypassing determinations of a disclosure inclusion status and conformity status for the digital content. In such embodiments, as the digital content is determined not to need a required disclosure, it may be desirable for the disclosure validation system 102 to not attempt to identify or process any disclosures that may be included in the digital content (e.g., in order to preserve computational resources for other tasks). However, in some embodiments and as shown in FIG. 3, even though the applicability status indicates that the required disclosure does not apply to the digital content, the disclosure validation system 102 may continue to determine a disclosure inclusion status and conformity status for the digital content. For example, the digital content (which does not need a required disclosure) may already include a required disclosure, however, the disclosure may be in the incorrect format. Such an error may cause issues for the bank (e.g., fines or other legal issues in the event regulators identify the incorrect disclosure), even though the digital content does not need a required disclosure to begin with. By continuing to determine a disclosure inclusion status and conformity status regardless of the applicability status, users of the disclosure validation system 102 are made more aware of any flaws of the digital content, and are thus enabled to more readily correct any identified issues.

In some embodiments, as shown in FIG. 3, after determining an applicability status, the method may then perform operations shown in FIGS. 4 and 5 which involve determining an identifier inclusion status and an identifier validation status for digital content. As discussed above, the validation engine 210 may be utilized to determine whether identifiers are present within digital content to ensure that the digital content has gone through a review process, and also validate whether the digital content is still in compliance. In this regard, the validation engine 210 may readily identify instances where expired content is in circulation and/or being used or otherwise made publicly available such that the expired content can be quickly addressed and either updated and/or removed from public access.

Turning to FIG. 4, at operation 402, the apparatus 200 includes means, such as processor 202, memory 204, validation engine 210, and/or the like, for determining an identifier inclusion status for the digital content. The identifier inclusion status may indicate whether the digital content includes an identifier indicating a previous review of the digital content. As discussed above, the identifier may be a specific type of identifier (in a specific format) that indicates whether the digital content has previously undergone a review (e.g., a manual (human) review or an automated system review). The identifier may be associated with a (e.g., third-party) compliance system which issues and tracks identifiers for various digital content, and may be time-limited and associated with an expiration date defining a point in time at which the digital content should be reviewed again and assigned a new identifier and/or updated expiration date.

In some embodiments, the validation engine 210 may utilize scraping techniques or NLP techniques (similar to scraping techniques and NLP techniques utilized by the content analysis engine 208 described above) to determine whether the digital content includes an identifier within the digital content, such as within metadata, code (e.g., markup language, software code, and/or the like), and/or the like associated with the digital content. In some embodiments, the validation engine 210 may utilize regular expressions (regex), or sequences of characters that define a search pattern, in order to determine whether the digital content includes an identifier. For instance, a regex may be constructed which captures the specific format of the identifier. The validation engine 210 may then apply the regex to text of the digital content to find any occurrence of the defined identifier format. If a match is found, the validation engine 210 may determine an identifier inclusion status for the digital content that indicates that the digital content includes an identifier. If a match is not found, the validation engine 210 may determine an identifier inclusion status for the digital content that indicates that the digital content does not include an identifier.

As shown in FIG. 4, in response to determining an identifier inclusion status that indicates that the digital content includes an identifier, the method may continue to operation 404, wherein the apparatus 200 includes means, such as processor 202, memory 204, validation engine 210, and/or the like, for determining an identifier validation status for the identifier. Turning to FIG. 5, example operations are shown for determining an identifier validation status for the identifier.

As shown by operation 502, the apparatus 200 includes means, such as processor 202, memory 204, validation engine 210, and/or the like, for comparing the identifier to one or more stored identifiers to determine whether a match exists between the identifier and a stored identifier of the one or more stored identifiers. As discussed above, the validation engine 210 may access a repository (e.g., database 106) storing valid, registered identifiers to validate the identifier included in digital content (i.e., determine that the identifier is valid in that a match exists between the identifier and a stored identifier). In this regard, the validation engine 210 may iterate through the stored identifiers in order to determine whether a match exists.

As shown by operation 504, the apparatus 200 includes means, such as processor 202, memory 204, validation engine 210, and/or the like, for determining whether the identifier has expired based on an expiration date associated with the identifier. For instance, in situations where the identifier indicates or is otherwise associated with an expiration date, the validation engine 210 may compare the expiration date to a current date to determine whether the identifier has expired.

As shown by operation 506, the apparatus 200 includes means, such as processor 202, memory 204, validation engine 210, and/or the like, for assigning the identifier validation status based at least on whether a match exists between the identifier and a stored identifier of the one or more stored identifiers. For example, the identifier validation status may indicate (i) whether the digital content includes an identifier (i.e., an identifier inclusion status), (ii) whether the identifier, if included in the digital content, is a valid identifier (e.g., matches a valid identifier stored in the repository), and (iii) whether the identifier is expired.

In some embodiments, the disclosure validation system 102 may perform operation 404 of FIG. 4 as a standalone procedure (e.g., separate from the operations shown in FIG. 3). For example, physical documents may be abundant throughout an organization, and an individual may be uncertain as to whether a certain physical document is still valid for use (e.g., whether the document is associated with an identifier and that the identifier is valid and not out of date) such that the individual can publicly display or provide the document to customers. For example, in some embodiments, the disclosure validation system 102 enable a user to scan (via a scanning device (such as client device 208A-208N)) a barcode (such as a Quick Response (QR) code) associated with the physical document (e.g., present on the physical document or present elsewhere, such as another template document associated with the physical document). The disclosure validation system 102 may interpret the barcode scan to locate a stored identifier for the document. In turn, the disclosure validation system 102 may leverage validation engine 210 to determine a validation status for the document and cause presentation of the validation status back to the individual (e.g., via display on the individual's client device 208A-208N). In some embodiments, the determination of this validation status may also include performance of operations 502-506 as shown in FIG. 5. In this manner, the disclosure validation system 102 may enable a user to perform a quick "in-the-field" check to ensure a physical document is compliant (at least with respect to a third-party compliance system) without having to separately generate and upload a digital version of the physical document.

Returning to FIG. 3, as shown by operation 306, the apparatus 200 includes means, such as processor 202, memory 204, disclosure analysis engine 212, and/or the like, for determining a disclosure inclusion status for the digital content. The disclosure inclusion status may indicate whether the digital content includes a candidate disclosure. In this regard, in some embodiments, the disclosure inclusion status may reflect a binary (yes or no) choice on whether the digital content includes a disclosure (which may or may not conform to requirements associated with a required disclosure).

In some embodiments, the disclosure analysis engine 212 may determine the disclosure inclusion status for the digital content by determining whether the digital content includes a phrasing that matches a predefined disclosure phrasing indicated by one or more predefined disclosure templates.

A predefined disclosure template may comprise a data structure which includes text to be included in a required disclosure. As one example, FIG. 7 shows an example representation of text of a required disclosure related to NDIP which is required to be included on digital content that is associated with NDIP. In this regard, a predefined disclosure template may include the text shown in FIG. 7. The disclosure analysis engine 212 may compare a phrasing of the candidate disclosure included in digital content to a predefined disclosure phrasing indicated by one or more of the predefined disclosure templates to ensure the phrasings are consistent. It is to be appreciated that in some instances, a required disclosure may be satisfied with one of a plurality of predefined disclosure templates. For example, another predefined disclosure template may include more words or bullet points than what is shown in FIG. 7, however, an entity may have a choice of whether to present a required disclosure as the text shown in FIG. 7 or as different text indicated in another predefined disclosure template. As such, the disclosure analysis engine 212 may compare phrasings include in digital content to multiple predefined disclosure templates in order to determine a disclosure inclusion status for the digital content.

In some embodiments, for instance, in situations where the applicability status indicates that the required disclosure does not apply to the digital content and, however, the disclosure inclusion status indicates that the digital content does include a candidate disclosure, the disclosure validation system 102 may take additional action to remove the candidate disclosure from the digital content. For example, as noted above, even though the digital content does not need a required disclosure to begin with, the inclusion of a required disclosure may spell legal trouble for the bank (e.g., in the event the disclosure is in the incorrect format). In some embodiments, the disclosure validation system 102 may leverage communications hardware 206 to communicate a notification to a device (e.g., a client device 108A-108N managed by a system administrator or the like) that indicates non-applicable digital content as containing a candidate disclosure. In this manner, personnel may be notified in a timely manner such that actions can be taken to remove the candidate disclosure from the digital content accordingly.

As shown in FIG. 3, in response to determining a disclosure inclusion status that indicates that the digital content includes the candidate disclosure, the method may continue to operation 308, wherein the apparatus 200 includes means, such as processor 202, memory 204, disclosure analysis engine 212, and/or the like, for determining a conformity status for the digital content. A conformity status may indicate whether the candidate disclosure included in the digital content conforms to a set of styling requirements. For example, it may not be enough that the digital content includes text of a required disclosure. In this regard, a regulatory body may mandate that the text of a required disclosure be presented in digital content in a certain manner.

In some embodiments, a required disclosure may be associated with a set of styling requirements, which indicate specific rules for how a required disclosure is to appear within digital content. The set of styling requirements may comprise a data structure indicating various data which represent various styling requirements for a required disclosure and may be stored, for example, in connection with a predefined disclosure template (e.g., in database 106 or the like).

For example, text of a required disclosure may be required to be displayed in a certain font and at a certain point size such that the text is legible to be read by a human. In this regard, the set of styling requirements may include a font size styling requirement indicating a minimum font size allowed for the required disclosure.

As another example, the text of a required disclosure may be required to be displayed in a bulleted manner (e.g., as shown in FIG. 7). In this regard, the set of styling requirements may include a bulleting styling requirement indicating a particular use of bullet points for the required disclosure.

As another example, the text of a required disclosure may be required to be displayed in a box (e.g., as shown in FIG. 7) such that the text is displayed distinctly from other elements of the digital content. In this regard, the set of styling requirements may include a boxing styling requirement indicating a particular use of boxing for the required disclosure.

As another example, the text of a required disclosure may be required to be displayed in a certain position within the digital content in relation to other elements of the digital content. In this regard, the set of styling requirements may include a positioning styling requirement indicating a particular positioning for the required disclosure.

As another example, the text of a required disclosure may be required to be bold or otherwise emphasized. In this regard, the set of styling requirements may include a bolding styling requirement indicating a use of bolding for the required disclosure.

In this regard, the disclosure analysis engine 212 may determine a conformity status for the digital content by determining whether the candidate disclosure including in the digital content conforms to styling requirements of a set of styling requirements (e.g., a font size styling requirement, a boxing styling requirement, a positioning styling requirement, a bolding styling requirement, a bulleting styling requirement, and/or the like).

To do so, in some embodiments, the disclosure validation engine 212 may utilize one or more scraping techniques (discussed above) to extract styling information from digital content and compare the styling information to values indicated by the set of styling requirements. For example, in an instance in which the digital content is a web page, the disclosure analysis engine 212 may iterate through markup language associated with the web page to identify stylistic-related markup language associated with the candidate disclosure included in the digital content. The disclosure analysis engine 212 may then compare values associated with the stylistic-related markup language to values indicated by the set of styling requirements to determine whether the values associated with the stylistic-related markup language correspond to the values indicated by the set of styling requirements.

As shown by operation 310, the apparatus 200 includes means, such as processor 202, memory 204, content analysis engine 208, and/or the like, for determining a digital content status for the digital content. The digital content status may be determined based at least on one or more of an applicability status, an identifier inclusion status, an identifier validation status, a disclosure inclusion status, and a conformity status. In this regard, the digital content status may provide a comprehensive analysis of the digital content with respect to a required disclosure based on the various determined statuses described above.

As shown by operation 312, the apparatus 200 includes means, such as processor 202, memory 204, communications hardware 206, and/or the like, for causing presentation of the digital content status. For example, the digital content status may be presented visually, e.g., at a client device in response to an upload of the digital content to the disclosure validation system 102. In some embodiments, presentation of the digital content status may comprise a plain language explanation of whether a required disclosure applies to the digital content, whether an identifier is included in the digital content and if so whether that identifier is valid and not expired, whether the digital content includes a disclosure, and if so, whether the disclosure adheres to a set of styling requirements associated with the required disclosure. In some embodiments, such as situations in which digital content is automatically collected for validation without user intervention, the digital content status may be presented (e.g., in the form of a notification) at a device associated with a user responsible for managing the particular digital content in order to inform the user of the status and allow the user to take necessary actions.

In some embodiments, such as in situations where the digital content is unpublished digital content and the digital content status is satisfactory (e.g., the digital content status indicates that the digital content is applicable and contains the required disclosure and adheres to all required stylistic requirements), the disclosure validation system 102 may facilitate an automatic publication of the digital content (e.g., without any human review or interaction). In this regard, the apparatus 200 includes means, such as processor 202, memory 204, communications hardware 206, and/or the like, for facilitating an automatic publication of the digital content. The publication may involve automatically publishing (e.g., via a CMS) the digital content to the internet, an intranet, or other accessible platform viewable by users such as customers and/or the like.

In some embodiments, such as in situations where the digital content is published digital content and the digital content status is unsatisfactory (e.g., the digital content status indicates that the digital content is applicable and does not include the required disclosure, or, if the digital content does include the required disclosure, the disclosure does not adhere to all required stylistic requirements), the disclosure validation system 102 may perform or facilitate a performance of at least one action associated with the unpublished digital content. In this regard, the apparatus 200 includes means, such as processor 202, memory 204, communications hardware 206, and/or the like, for performing at least one action associated with the published digital content. For example, the at least one action may comprise automatically deactivating public access to the published digital content. Example actions may involve facilitating a deactivation of a hyperlink associated with the digital content, temporarily removing or censoring certain portions of the digital content from a web page, and/or the like, such that the digital content may be addressed appropriately. In some embodiments, facilitating a deactivation of a hyperlink may involve injecting source code and/or markup language into one or more existing webpages linking to the digital content. For example, the disclosure validation system 102 may remove an underlying link tag from a web page's source code, add a disabling element to a link element associated with the digital content (e.g., in HTML), inject CSS rules to make a hyperlink visually appear to be deactivated, and/or the like.

FIGS. 3-5 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved disclosure validation. Example embodiments thus provide tools that overcome the problems faced by conventional techniques for validating digital content with respect to a required disclosure. By avoiding the need to manually perform disclosure validation processes including determining whether a required disclosure applies to digital content, verifying inclusion of an identifier within the content, verifying that the content contains a disclosure, and verifying whether the disclosure included in the content adheres to necessary styling requirements, example embodiments thus save time and resources, while also eliminating the possibility of human error that has been unavoidable in the past. Moreover, by automating functionality that has historically required human analysis, the speed and consistency of the evaluations performed by example embodiments unlocks many potential new functions that have historically not been available, such as the ability to conduct near-real-time disclosure validation for a vast amount of digital content stemming from a variety of sources. As these examples all illustrate, example embodiments contemplated herein provide technical solutions that solve real-world problems faced during conventional manual disclosure validation processes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

22

What is claimed is:

1. A method comprising:

determining, by a web crawler and via a processor, a plurality of web pages of a website;

automatically receiving, by communications hardware and based on the determination, source code of a first web page of the website;

extracting, by a content analysis engine and via the processor, a term set from the source code by parsing the source code, the term set comprising a plurality of tokenized terms deciphered from the source code;

comparing, by the content analysis engine and via the processor, tokenized terms of the term set to a plurality of predefined combinations of two or more terms of a predefined lexicon, wherein terms of the predefined lexicon relate to a required disclosure;

determining, based on the comparison and by the content analysis engine and via the processor, that the term set includes at least two tokenized terms that match a predefined combination of two or more terms of the predefined lexicon;

in response to determining that the term set includes the at least two tokenized terms, determining, by the content analysis engine and via the processor, an applicability status for the first web page indicating that the required disclosure should be included within the source code such that the required disclosure is electronically displayed when the first web page is electronically displayed;

determining, by a disclosure analysis engine and via the processor, that the term set includes a phrase of terms that matches a predefined phrase included in a predefined disclosure template associated with the required disclosure;

in response to determining that the term set includes the phrase of terms, determining, by the disclosure analysis engine and via the processor, a disclosure inclusion status for the first web page indicating that the first web page includes a candidate disclosure;

in response to determining the disclosure inclusion status:

determining, by the disclosure analysis engine and via the processor, a conformity status for the first web page indicating that the candidate disclosure included in the first web page fails to conform to at least one styling requirement of a set of styling requirements associated with the predefined disclosure template, the set of styling requirements collectively defining a required manner of appearance of the required disclosure when visually displayed within the first web page, wherein determining the conformity status comprises at least:

determining, by the disclosure analysis engine and via the processor, styling-related source code corresponding to the candidate disclosure in the source code, and determining, by the disclosure analysis engine and via the processor, whether the candidate disclosure conforms to the set of styling requirements based on values in the styling-related source code, including at least:

determining, by the disclosure analysis engine and via the processor, whether the candidate disclosure conforms to a font size styling requirement of the set of styling requirements by determining whether a font point size value in the styling-related source code satisfies a minimum font point size value indicated by the set of styling requirements;

determining, by the content analysis engine and via the processor, an unsatisfactory digital content status for the first web page based at least on the conformity status; and in response to determining the unsatisfactory digital content status, performing, by the communications hardware and via the processor, a set of actions associated with the first web page, wherein performing a first action of the set of actions comprises:

automatically injecting a disabling element into second source code of a second web page of the website in a manner that applies the disabling element to a link tag included in the second source code, wherein the link tag corresponds to a hyperlink of the second web page that navigates to the first web page when selected, and wherein the application of the disabling element to the link tag disables navigation to the first web page from selection of the hyperlink of the second web page.

2. The method of claim 1, further comprising:

performing, by the communications hardware, a second action of the set of actions associated with the first web page.

3. The method of claim 2, wherein the second action comprises temporarily removing or censoring a portion of the first web page.

4. The method of claim 1, further comprising:

determining, by a validation engine and via the processor, an identifier inclusion status for the first web page indicating whether the first web page includes an identifier indicating a previous review of the first web page; and in response to determining an identifier inclusion status that indicates that the first web page includes the identifier:

determining, by the validation engine and via the processor, an identifier validation status for the identifier, wherein determining the unsatisfactory digital content status for the first web page is further based on at least one of the identifier inclusion status and the identifier validation status.

5. The method of claim 4, wherein determining the identifier validation status for the identifier comprises:

comparing, by the validation engine and via the processor, the identifier to one or more stored identifiers to determine whether a match exists between the identifier and a stored identifier of the one or more stored identifiers; and assigning, by the validation engine and via the processor, the identifier validation status based at least on whether a match exists between the identifier and a stored identifier of the one or more stored identifiers.

6. The method of claim 5, wherein determining the identifier validation status for the identifier further comprises:

determining, by the validation engine and via the processor, whether the identifier has expired based on an expiration date associated with the identifier, wherein assigning the identifier validation status is further based on whether the identifier has expired.

7. The method of claim 1, wherein the set of styling requirements comprise a boxing styling requirement, a positioning styling requirement, a bolding styling requirement, and a bulleting styling requirement.

8. The method of claim 7, wherein determining the conformity status for the first web page further comprises:

iterating, by the disclosure analysis engine and via the processor, through the source code to determine the styling-related source code corresponding to the candidate disclosure; and comparing, by the disclosure analysis engine and via the processor, first values included within the styling-related source code to second values indicated by one or more of the boxing styling requirement, the positioning styling requirement, the bolding styling requirement, and the bulleting styling requirement of the set of styling requirements to determine whether the first values correspond to the second values.

9. The method of claim 7, wherein the bulleting styling requirement requires that text of the required disclosure be displayed using bullet points.

10. The method of claim 7, wherein the positioning styling requirement requires that the required disclosure be displayed in a certain position relative to other elements of the first web page.

11. The method of claim 1, further comprising:

receiving, by the communications hardware, digital content different from the first web page; and determining, by the content analysis engine, a digital content status for the digital content.

12. The method of claim 11, wherein the digital content comprises a message dynamically generated by a chatbot during an active chat session with a user.

13. The method of claim 11, wherein the digital content comprises an unsent electronic mail message.

14. The method of claim 11, further comprising:

receiving, by the communications hardware, the digital content based on either (i) an upload of the digital content by a user or (ii) a dynamic generation of the digital content.

15. The method of claim 1, wherein determining the applicability status for the first web page further comprises:

processing, by the content analysis engine and via the processor, the first web page using a model to determine a probability score representing a likelihood that the required disclosure applies to the first web page, wherein the model is trained using historical digital content to which the required disclosure was deemed to be applicable, wherein determining the applicability status is further based on the probability score satisfying a predefined threshold.

16. The method of claim 1, wherein the required disclosure is a non-deposit investment products (NDIP) disclosure.

17. An apparatus comprising:

a processor;

a web crawler configured, with the processor, to determine a plurality of web pages of a website;

communications hardware configured to automatically receive, based on the determination, source code of a first web page of the website;

a content analysis engine configured, with the processor, to:

extract a term set from the source code by parsing the source code, the term set comprising a plurality of tokenized terms deciphered from the source code, compare tokenized terms of the term set to a plurality of predefined combinations of two or more terms of a predefined lexicon, wherein terms of the predefined lexicon relate to a required disclosure, determine, based on the comparison, that the term set includes at least two tokenized terms that match a predefined combination of two or more terms of the predefined lexicon, and in response to determining that the term set includes the at least two tokenized terms, determine an applicability status for the first web page indicating that the required disclosure should be included within the source code such that the required disclosure is electronically displayed when the first web page is electronically displayed;

a disclosure analysis engine configured, with the processor, to:

determine that the term set includes a phrase of terms that matches a predefined phrase included in a predefined disclosure template associated with the required disclosure, in response to determining that the term set includes the phrase of terms, determine a disclosure inclusion status for the first web page indicating that the first web page includes a candidate disclosure, and in response to determining the disclosure inclusion status:

determining a conformity status for the first web page indicating that the candidate disclosure included in the first web page fails to conform to at least one styling requirement of a set of styling requirements associated with the predefined disclosure template, the set of styling requirements collectively defining a required manner of appearance of the required disclosure when visually displayed within the first web page, wherein the disclosure analysis engine is configured, with the processor, to determine the conformity status by at least:

determining styling-related source code corresponding to the candidate disclosure in the source code, and determining whether the candidate disclosure conforms to the set of styling requirements based on values in the styling-related source code, including at least:

determining whether the candidate disclosure conforms to a font size styling requirement of the set of styling requirements by determining whether a font point size value in the styling-related source code satisfies a minimum font point size value indicated by the set of styling requirements;

wherein the content analysis engine is further configured, with the processor, to determine an unsatisfactory digital content status for the first web page based at least on the conformity status; and wherein the communications hardware is further configured to perform, in response to determining the unsatisfactory digital content status, a set of actions associated with the first web page, wherein performing a first action of the set of actions comprises:

automatically injecting a disabling element into second source code of a second web page of the website in a manner that applies the disabling element to a link tag included in the second source code, wherein the link tag corresponds to a hyperlink of the second web page that navigates to the first web page when selected, and wherein the application of the disabling element to the link tag disables navigation to the first web page from selection of the hyperlink of the second web page.

18. The apparatus of claim 17, wherein the required disclosure is a non-deposit investment products (NDIP) disclosure.

19. A computer program product comprising at least one non-transitory computer-readable storage medium storing software instructions that, when executed, cause an apparatus to:

determine, using a web crawler, a plurality of web pages of a website;

automatically receive, based on the determination, source code of a first web page of the website;

extract a term set from the source code by parsing the source code, the term set comprising a plurality of tokenized terms deciphered from the source code;

compare tokenized terms of the term set to a plurality of predefined combinations of two or more terms of a predefined lexicon, wherein terms of the predefined lexicon relate to a required disclosure;

determine, based on the comparison, that the term set includes at least two tokenized terms that match a predefined combination of two or more terms of the predefined lexicon;

in response to determining that the term set includes the at least two tokenized terms, determine an applicability status for the first web page indicating that the required disclosure should be included within the source code such that the required disclosure is electronically displayed when the first web page is electronically displayed;

determine that the term set includes a phrase of terms that matches a predefined phrase included in a predefined disclosure template associated with the required disclosure;

in response to determining that the term set includes the phrase of terms, determine a disclosure inclusion status for the first web page indicating that the first web page includes a candidate disclosure;

in response to determining the disclosure inclusion status:

determine a conformity status for the first web page indicating that the candidate disclosure included in the first web page fails to conform to at least one styling requirement of a set of styling requirements associated with the predefined disclosure template, the set of styling requirements collectively defining a required manner of appearance of the required disclosure when visually displayed within the first web page, wherein determining the conformity status comprises at least:

determining styling-related source code corresponding to the candidate disclosure in the source code, and determining whether the candidate disclosure conforms to the set of styling requirements based on values in the styling-related source code, including at least:

determining whether the candidate disclosure conforms to a font size styling requirement of the set of styling requirements by determining whether a font point size value in the styling-related source code satisfies a minimum font point size value indicated by the set of styling requirements;

determine an unsatisfactory digital content status for the first web page based at least on the conformity status; and in response to determining the unsatisfactory digital content status, perform a set of actions associated with the first web page, wherein performing a first action of the set of actions comprises:

automatically injecting a disabling element into second source code of a second web page of the website in a manner that applies the disabling element to a link tag included in the second source code, wherein the link tag corresponds to a hyperlink of the second web page that navigates to the first web page when selected, and wherein the application of the disabling element to the link tag disables navigation to the first web page from selection of the hyperlink of the second web page.

20. The computer program product of claim 19, wherein the required disclosure is a non-deposit investment products (NDIP) disclosure.

\* \* \* \* \*